(12) United States Patent
Furukawa (10) Patent No.: US 6,299,070 B1
(45) Date of Patent: Oct. 9, 2001

(54) DATA CARRIER AND A PRODUCTION METHOD FOR THE SAME

(75) Inventor: Kunitoshi Furukawa, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 09/282,430

(22) Filed: Mar. 31, 1999

(51) Int. Cl.⁷ .................................................. G06K 19/06

(52) U.S. Cl. ......................................... 235/492; 235/487

(58) Field of Search .................................. 235/487, 492, 235/491, 493; 463/29

(56) References Cited

U.S. PATENT DOCUMENTS

| | | | |
|---|---|---|---|
| 5,166,502 | * | 11/1992 | Rendleman et al. .................. 235/492 |
| 5,895,321 | * | 4/1999 | Gassies et al. ........................ 463/29 |
| 6,021,949 | * | 2/2000 | Boiron ................................. 235/492 |

\* cited by examiner

*Primary Examiner*—Karl D. Frech
(74) *Attorney, Agent, or Firm*—Foley & Lardner

(57) ABSTRACT

A data carrier includes a functional component inserted into a first depression in a molded tray. A doughnut-shaped antenna coil is inserted into a second annular depression in the tray. A rectangular cap, with two holes is installed to fix the functional component and the coil. A seal is created by injection molding to seal the tray and the upper portion of the cap.

9 Claims, 10 Drawing Sheets

DATA CARRIER AND A PRODUCTION METHOD FOR THE SAME

FIELD OF THE INVENTION

This invention relates to a data carrier used in a non-contact identification system and the method by which it is produced.

BACKGROUND OF THE INVENTION

Data carriers (ID tags) which maintain data in non-contact identification systems continue to be miniaturized, and the current focus is on producing a smaller, cheaper data carrier which is suitable for a variety of applications. These might include access control systems which allow a person with a data carrier or ID tag to enter, uniform collection systems for hospitals or restaurants, and tracking systems to keep track of articles of clothing at cleaners or laundries. Data carriers which are to be attached to clothing for laundry identification must be waterproof and heat-resistant so that they will not be damaged during cleaning. Because they are used for such a variety of applications, it is essential that data carriers be mass-produced as cheaply as possible, in the fewest possible processes, and in the shortest possible time.

Figure 7:
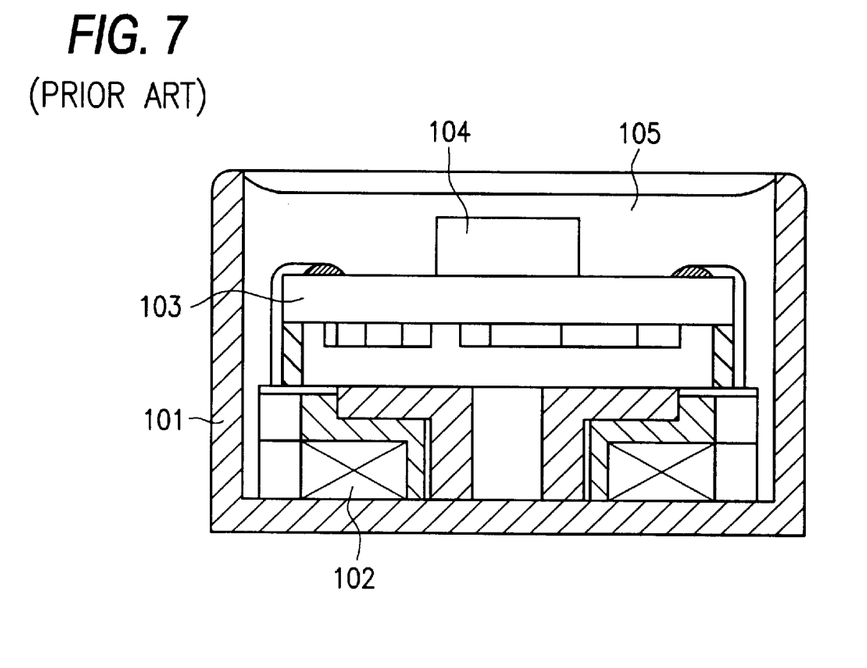
FIG. 7 illustrates a method used in the prior art to produce a data carrier by filling the mold with epoxy resin.

We shall now explain the existing methods of producing data carriers. A first method is shown in FIG. 7. Toroidal antenna coil 102 is placed in case 101. An electronic circuit unit (hereafter referred to as functional component 104) which contains a packaged IC is placed on printed circuit board 103 in case 101. The spaces are then filled with a resin 105, such as an epoxy resin or the like, to complete the data carrier.

Figure 8:
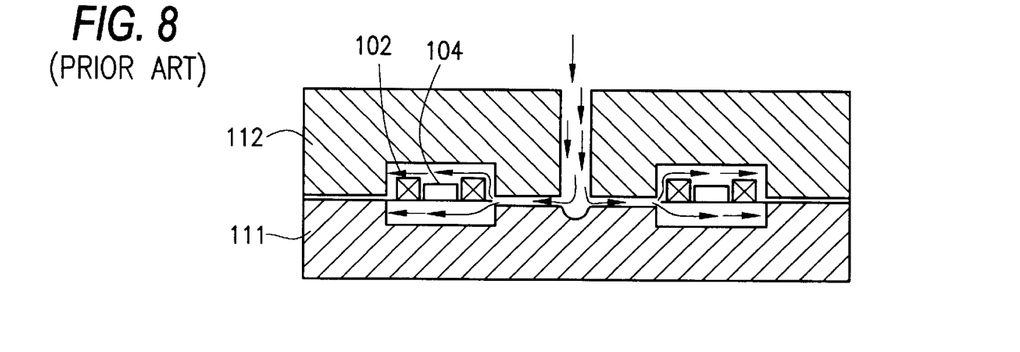
FIG. 8 illustrates a method used in the prior art to produce a data carrier using transfer molding.

A second method used to produce data carriers is transfer molding, which is illustrated in FIG. 8. Antenna coil 102 and functional component 104, which is connected to the antenna coil, are supported in a chamber inside molds 111 and 112. The chamber is filled via a narrow gateway with a thermosetting resin, such as epoxy resin, and the assembly is heated for several minutes to set the resin.

Figure 9A:
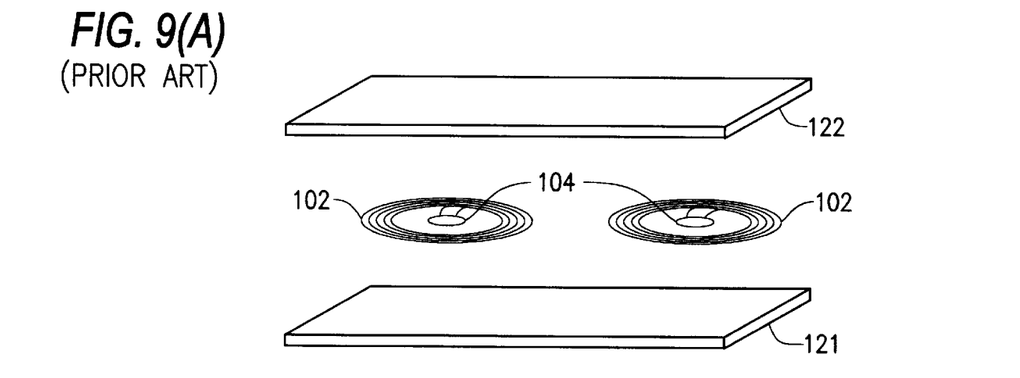
FIGS. 9(A)–(C) illustrate a method used in the prior art to produce a data carrier using press molding.
Figure 9B:
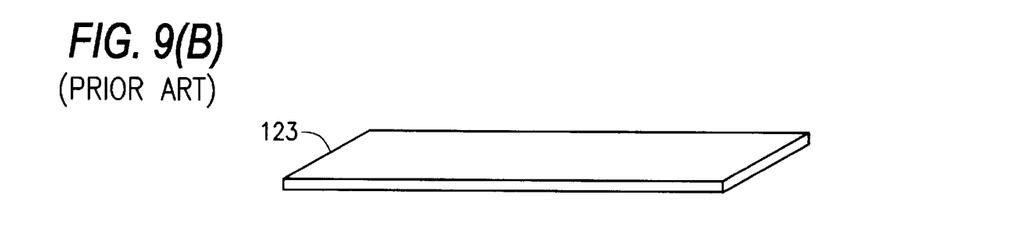
Figure 9C:
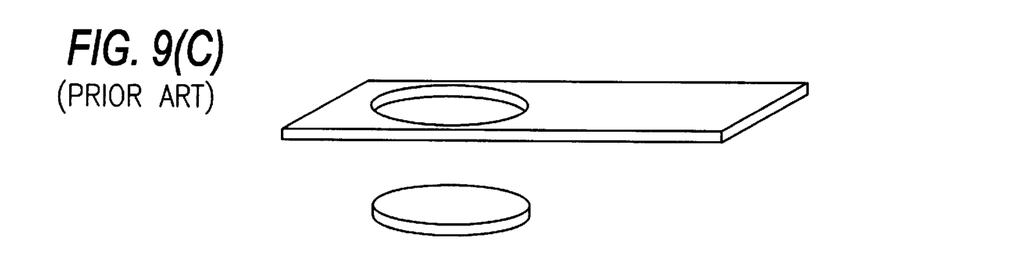

A third method used to produce data carriers is press molding. As shown in FIG. 9(a), a data carrier unit consisting of antenna coils 102 and functional component 104 is sandwiched between sheets 121 and 122 of vinyl chloride (PVC) and press-molded. Once pressed, as can be seen in FIG. 9(b), the work becomes a flat plate 123. Then, as is illustrated in FIG. 9(c), round plugs are punched out of the plate to produce two flat data carriers.

Figure 10A:
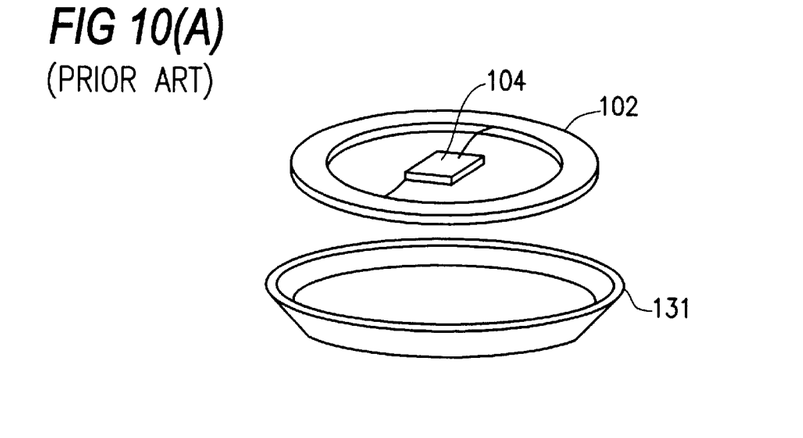
FIGS. 10(A)–(C) illustrate a method used in the prior art to produce a data carrier using injection molding.
Figure 10B:
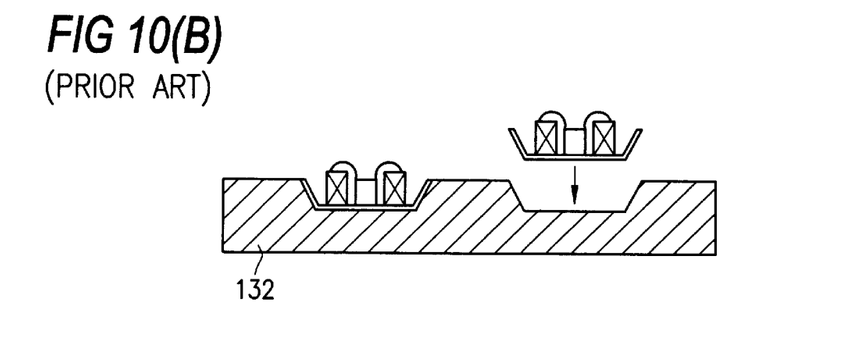
Figure 10C:
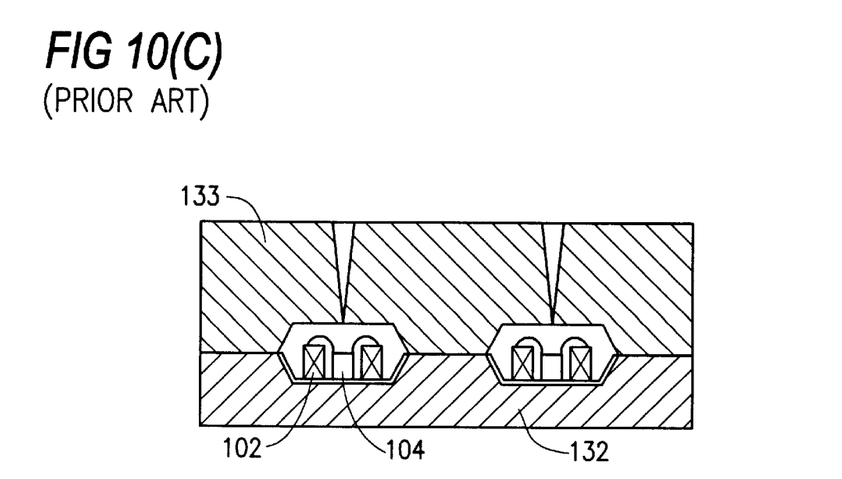

A fourth method uses injection molding to seal the data carrier. In this method, as is shown in FIGS. 10(a) and (b), a data carrier unit consisting of antenna coil 102 and functional component 104 is inserted into tray 131, which is produced by a molding process. Two of these assembled trays are then placed in the depressions in lower mold 132. Then, as is shown in FIG. 10(c), the lower mold is covered with upper mold 133, which also has two depressions in the locations which correspond to those in the lower mold. A thermoplastic resin is then injected at high pressure via the gates in upper mold 133 to form two button-shaped data carriers.

The above-described methods used in the prior art to produce data carriers are subject to the following problems regarding the water-resistance of the carriers and their ability to be mass-produced. With the resin-filling method shown in FIG. 7, the spaces must be filled slowly to prevent air bubbles from occurring. In addition to the care required in filling the spaces with resin, this method requires several hours for the resin to set.

Figure 11A:
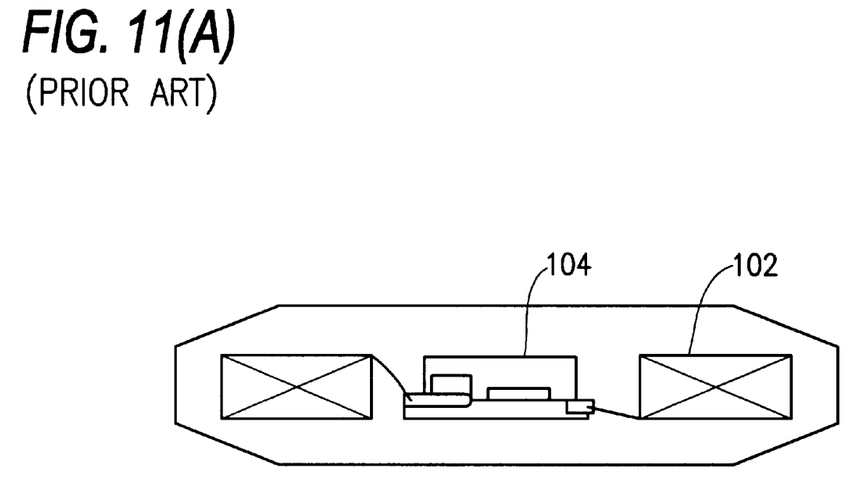
FIGS. 11(A)–(B) show how the antenna coil and functional component can slip out of position during the transfer molding employed in the prior art.
Figure 11B:
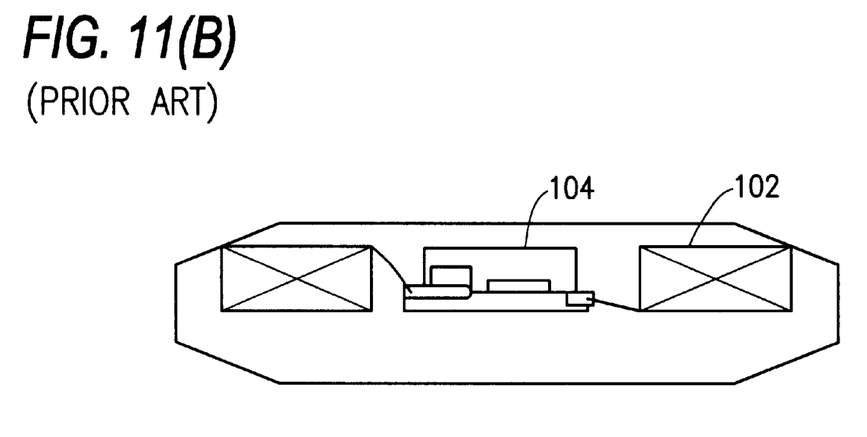

The transfer-molding method shown in FIG. 8 entails pressure-molding for several minutes, and it requires that the resin be cured by maintaining it at a high temperature for several hours or longer. Also, the high pressure required to seal the functional component in resin makes it liable to slip out of position. FIG. 11(a) shows the correct placement of antenna coil 102 and functional component 104. When the spaces in the mold are filled with resin, these components have a tendency to slide out of the center of the data carrier. The displacement of the functional component within the molded unit is not the only problem with this method. As can be seen in FIG. 11(b), antenna coil 102 and functional component 104 may also protrude from the surface of the resin seal.

In the press-molding method shown in FIGS. 9(A)–(C), a punch process is required after the work is pressed to produce a round flat carrier. This extra process requires additional time and effort. And since only a vinyl chloride or another resin with low heat resistance can be used for the sheet material, this method cannot be used to produce heat-resistant data carriers.

Figure 12A:
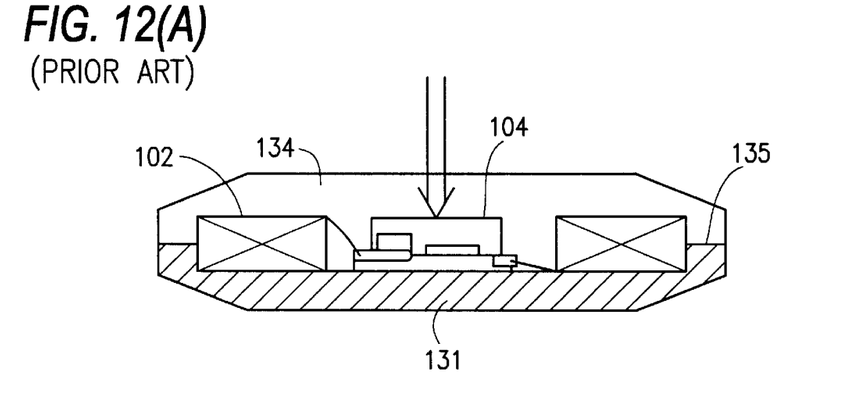
FIGS. 12(A)–(C) show cross sections of the injection molding method employed in the prior art, indicating the location where the injection pressure is applied and the altered condition after injection.

The injection molding method produces a data carrier in a short time; however, just as in transfer molding, the high pressure required tends to force the functional component out of its proper position. And because it is injected under such high pressure, the resin may damage functional component 104 when it strikes it dead center, as shown in FIG. 12(a). For these reasons, manufacturers tend to inject the resin at a lower pressure, which results in a rougher-textured product that is easier to damage. Also, a parting compound is added to the resin so that the finished data carrier can be removed from the mold easily. Repeated incidences of heat shock may cause cracks to occur in surface 135 where seal 134 is in contact with tray 131. Since this may result in the seal separating from the tray, the injection method cannot guarantee a hermetic seal.

Figure 12B:
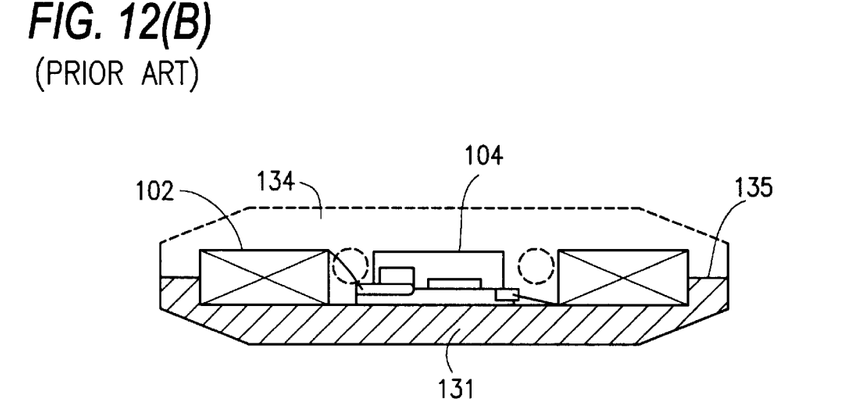
Figure 12C:
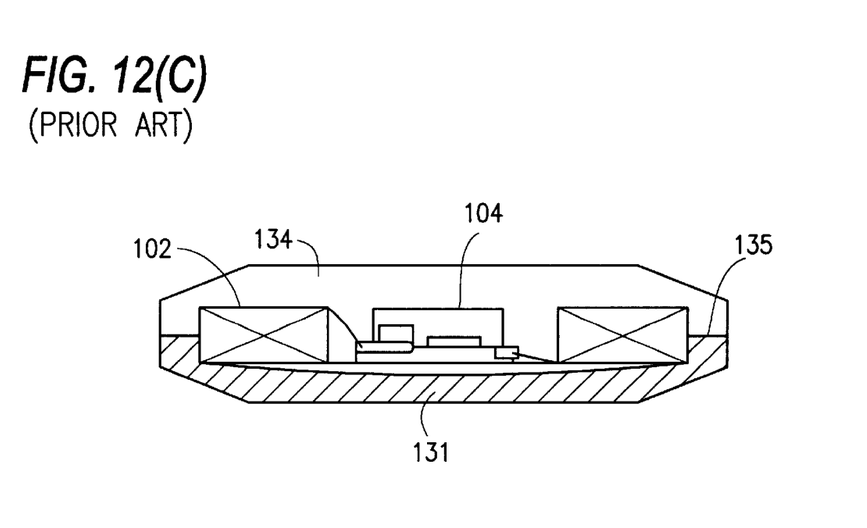

Although the injection mold has small air exhaust channels in it, if the components in it have a more complex shape, air pockets may form between the functional component and tray 131, as shown by the dotted lines in FIG. 12(b). If the work is molded at high temperature with these air pockets in it, the air will push tray 131 away from the functional component, and it will not be possible to achieve the specifications for which the mold was designed.

Figure 13A:
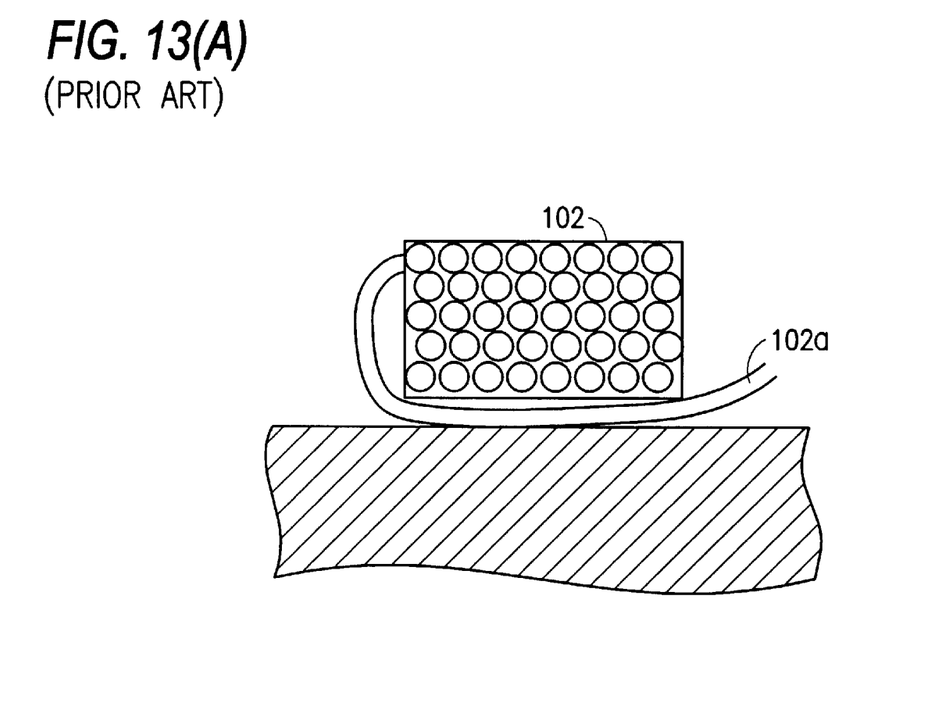
FIG. 13(a) shows the position of the lead cable of the antenna coil in the prior art and FIG. 13(b) shows a lead cable according to this invention.

As can be seen in FIG. 13(a), the lead cable 102a of antenna coil 102 is normally passed under the body of the coil and connected to the functional component during injection so that it will not be damaged. Nevertheless, the injection pressure applied to antenna coil 102 may damage the insulation on the lead cable 102a. If this happens, the inductance and the resonant frequency will deviate from their specified values and the data carrier will not maintain its characteristics.

SUMMARY OF THE INVENTION

This invention alleviates the shortcomings of prior art devices discussed above. The object of this invention is to provide a data carrier which can be produced economically in a short time, which has superior mass-production characteristics, and which is highly resistant to water and heat, and to provide a production method by which such a data carrier can be produced.

The data carrier according to this invention is distinguished by at least the following features. It has an antenna coil; a functional component consisting of an electronic circuit unit connected to both ends of the antenna coil; a tray with a cylindrical portion having a first depression in its surface and a second annular-shaped depression which surrounds the cylindrical portion, and which supports, in the first and second depressions, the aforesaid functional component and antenna coil. A cap is installed over the aforesaid cylindrical portion to cover the aforesaid functional component, and a seal created by injection molding seals the aforesaid tray and upper portion of the cap.

The production method for a data carrier according to this invention is distinguished by the following steps. Firstly, a functional component consisting of an electronic circuit unit is connected to both ends of an antenna coil. A tray is, then, molded which has a cylindrical portion with a first depression in its surface and a second annular depression surrounding the central portion. The functional component and the aforesaid antenna coil are, then, inserted into the respective depressions in the aforesaid tray. A cap is, then, installed from above the aforesaid cylindrical portion so as to cover the aforesaid functional component. The aforesaid tray is, then, loaded into an injection mold. The data carrier is, finally, sealed by injecting resin from above toward the aforesaid cap.

DETAILED DESCRIPTION OF THE INVENTION

Figure 1:
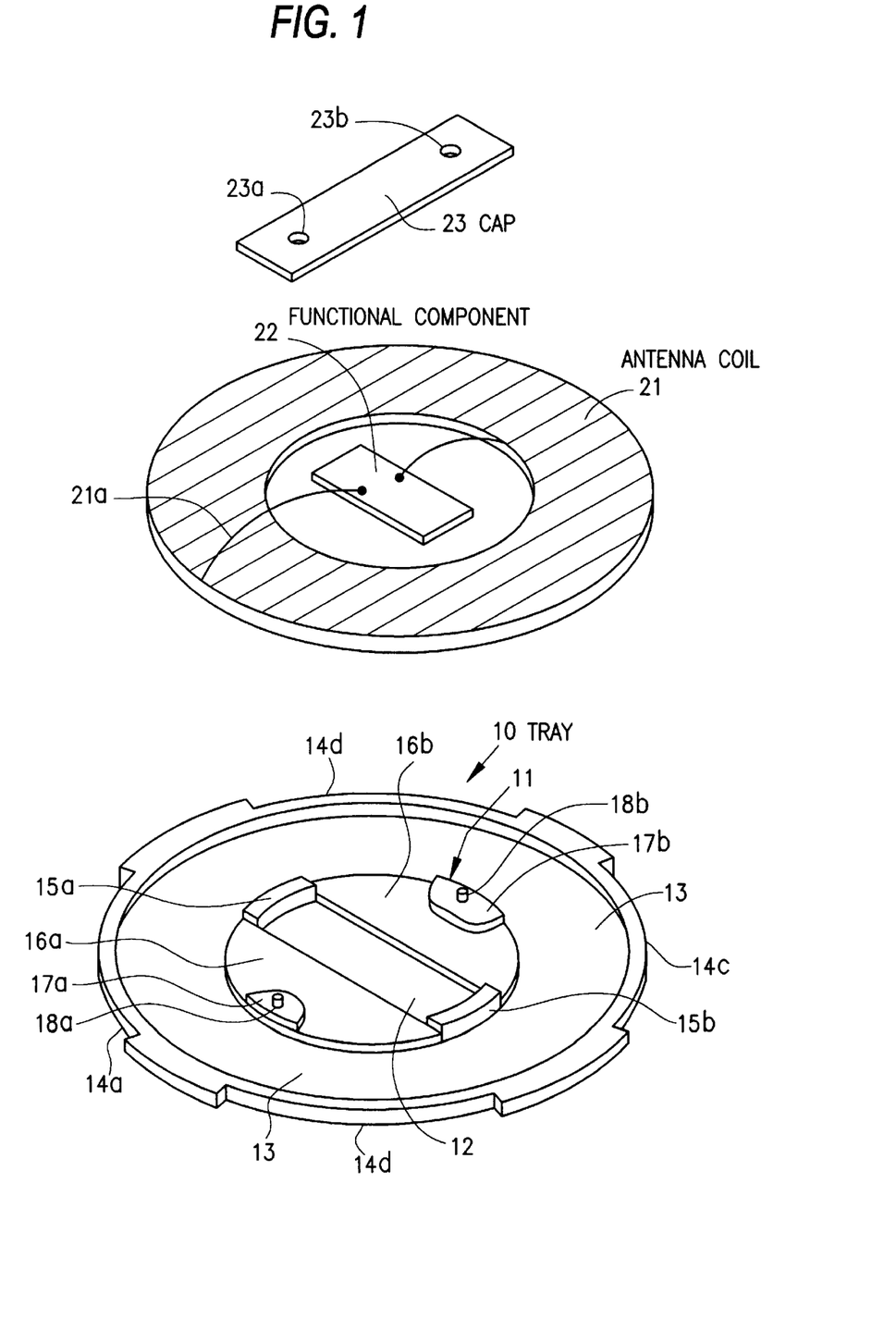
FIG. 1 shows the assembly of a data carrier in a preferred embodiment of this invention.
Figure 2:
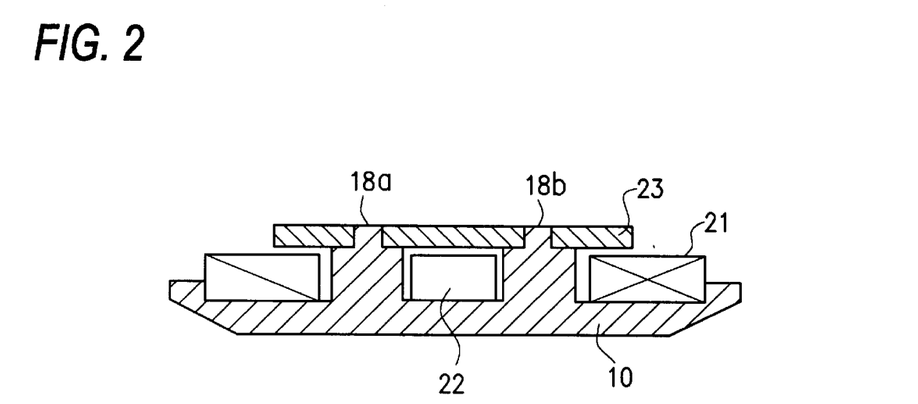
FIG. 2 is a cross section of tray belonging to this embodiment of a data carrier with the functional component inserted into it.
Figure 3:
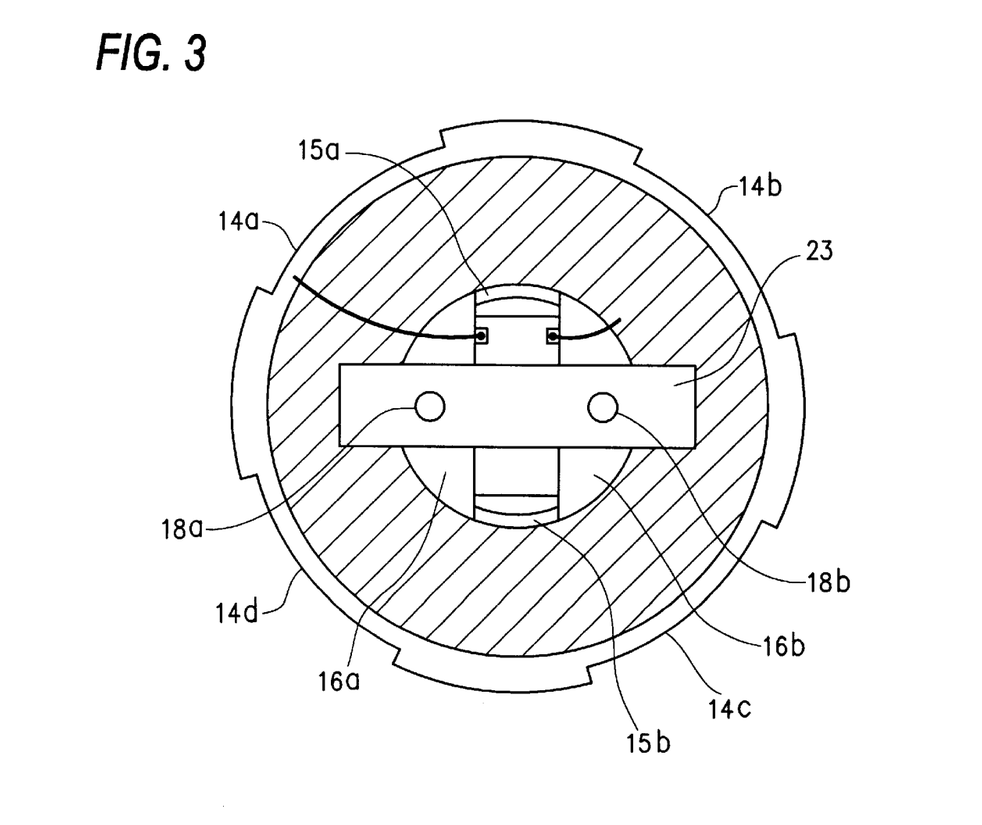
FIG. 3 is a plan view of a tray belonging to this embodiment of a data carrier with both the functional component and the cap installed.

The data carrier 1 in a preferred embodiment of this invention is produced using injection molding. FIG. 1 shows the assembly of data carrier 1 before it is molded. FIG. 2 shows a cross section of the same data carrier. FIG. 3 shows a plan view. As seen in FIG. 1, tray 10 of data carrier 1 is a flat circular piece. In its center is a vertical cylindrical portion 11. In the center of cylindrical portion 11 is a first depression 12. Cylindrical portion 11 contacts and supports the inner periphery of an antenna coil 21. Functional unit 22 is immobilized in the first depression 12. Around the cylindrical portion 11 is an annular second depression 13. The peripheral surface of tray 10, which forms the lateral wall of the data carrier, is cut away in four places to form shallow indentations 14a, 14b, 14c and 14d. In the cylindrical portion 11, curved walls 15a and 15b rise to a specified height. On either side of these curved walls, from the chords which connect them to the periphery of the cylinder, are flat portions 16a and 16b, which lie somewhat lower than the curved walls 15a and 15b. Semicircular portions 17a and 17b, which are elevated above the surface of flat portions 16a and 16b, are placed symmetrically facing each other on the opposite ends of the flat portions. On each of semicircular portions 17a and 17b is a boss 18a or 18b to help lock the functional component in position. Between the two flat portions 16a and 16b is a space within cylindrical portion 11 into which the functional component 22 will fit exactly so as to prevent any air from being trapped in the interior of the data carrier.

Figure 4:
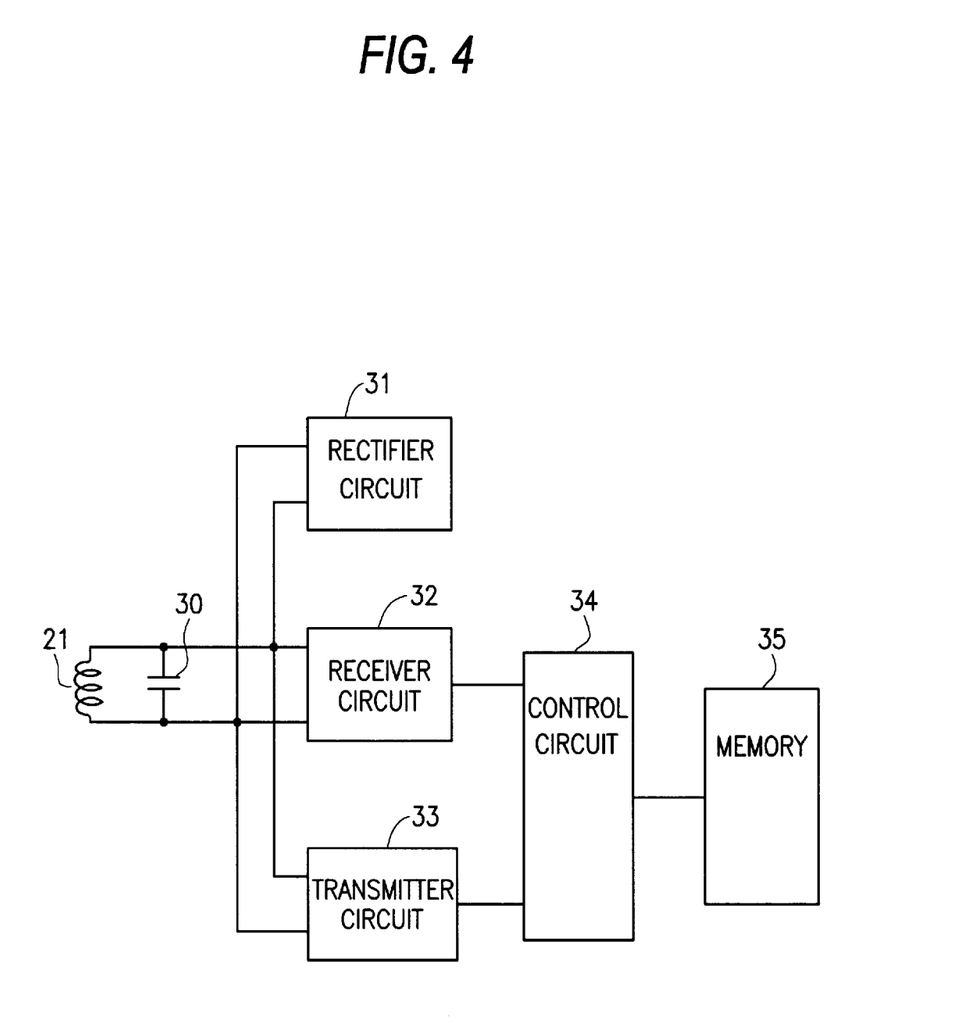
FIG. 4 is a block diagram of the antenna coil and functional component of a data carrier in the preferred embodiment of this invention.
Figure 13B:
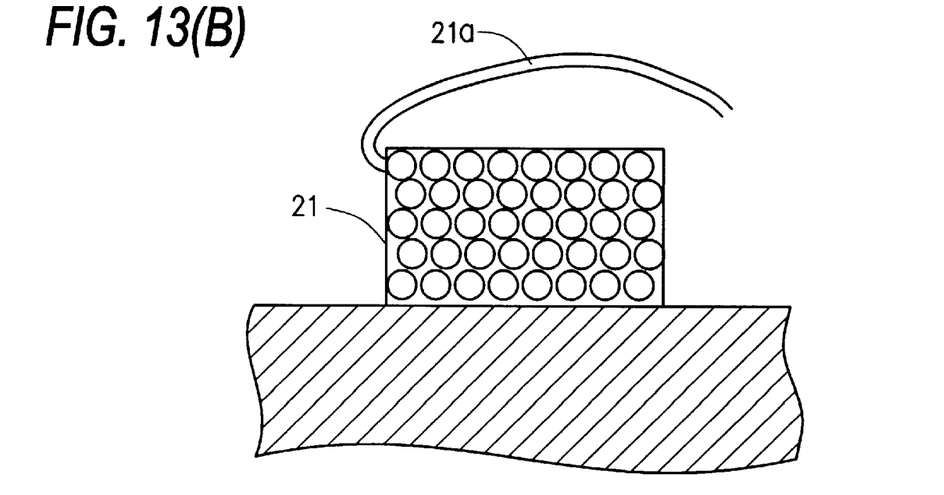

The lead cable 21a of antenna coil 21 is pulled over the top of the main body of the coil, as shown in FIG. 13(b), and connected to functional component 22. In functional component 22, as seen in FIG. 4, a capacitor 30, a rectifier circuit 31, a receiver circuit 32 and a transmitter circuit 33 are connected to the antenna coil 21. Rectifier circuit 31 rectifies and smoothes the AC voltage which is obtained from the antenna coil and supplies it to the other components. Receiver circuit 32 receives the signal obtained from the antenna coil 21 and outputs it to a control circuit 34. Based on the command in the received signal, control circuit 34 writes the data into a memory 35 or reads data out of the memory 35. Data to be read out are transmitted via the transmitter circuit 33 to a read-write head (not shown). Functional component 22 is an electronic circuit component in which capacitor 30, the receiver and transmitter circuits and the memory are built into an IC consisting of a single chip.

Functional component 22, which is shown in FIG. 1, is inserted into first depression 12 in tray 10. The doughnut-shaped antenna coil 21 is inserted into the second depression 13. A rectangular cap 23, which has two holes, 23a and 23b, corresponding to bosses 18a and 18b, is installed in such a way that the bosses engage holes. When the cap 23 is installed, its lower surface is at the same height as semicircular portions 17a and 17b. Antenna coil 21 and functional component 22 cannot easily separate from tray 10, and the data carrier can be transported and handled without special precautions.

Figure 5A:
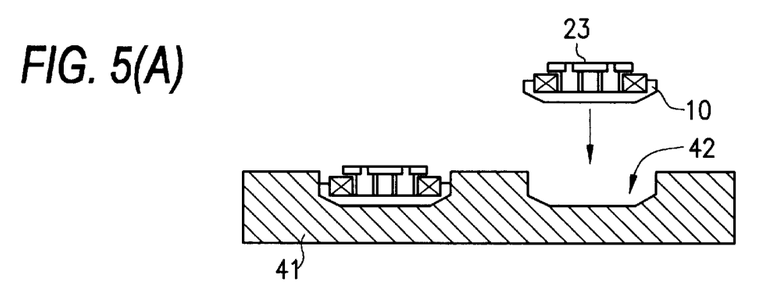
FIGS. 5(A)–(C) show cross sections of a tray to illustrate how it is inserted into the mold and the molding process.
Figure 5B:
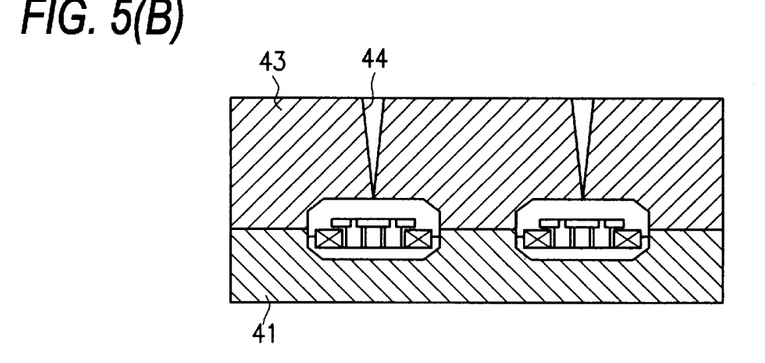
Figure 5C:
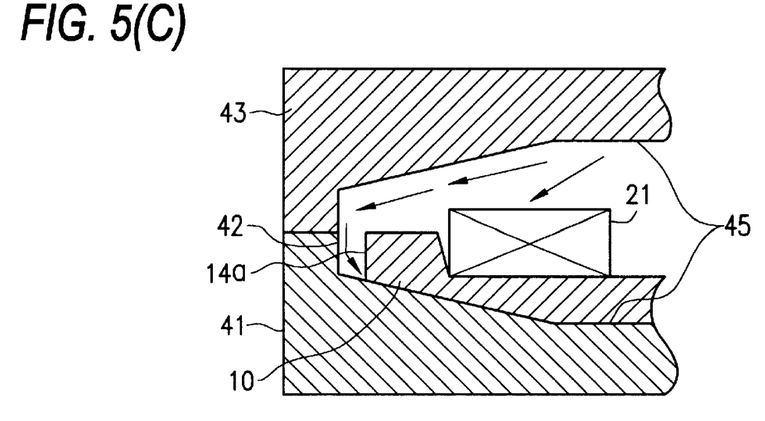

As seen in FIG. 5(a), tray 10, which supports antenna coil 21 and functional component 22, is inserted into lower mold 41. Indentation 42 in mold 41 has the same diameter as the outer periphery of tray 10. This insures that the tray 10 does not slip out of position in indentation 42 when it is inserted into the mold. At indentations 14a through 14d, as seen in FIG. 5(c), small spaces are left between the tray and the inner surface of lower mold 41. Upper mold 43 is placed on lower mold 41 as shown in FIG. 5(b). A resin, such as PPS resin or liquid crystal polymer (LCP resin), is injected through injection gates 44. The use of resins such as these allows the production of a heat-resistant data carrier. If heat resistance is not required in the data carrier, various other resins such as PBT can be used. The seal 45 formed by injection molding will have virtually the same external shape as the tray. Injection molding is typically completed in 30 to 40 seconds, which is a significant improvement over prior art methods.

In this sort of injection molding process, pressure is applied during injection to the top of cap 23. However, because the cap is supported on flat surfaces 17a and 17b, functional component 22 does not receive the direct impact of the resin. Therefore, there is no danger that component 22 will be damaged. In this embodiment, the lead cable 21a on the end of antenna coil 21 is drawn over the top of the main body of the coil and connected to functional component 22. This eliminates the possibility that its insulation will be breached by the pressure it experiences during injection and a short circuit will occur. In contrast to prior art methods, there is no need to use a lower injection pressure. The resin can be injected under high pressure, and a wider range of conditions can be set for the process.

In this embodiment, as can be seen in FIG. 1, four indentations 14a through 14d are cut out of the periphery of tray 10. These allow the sealing resin to flow around the sidewall of tray 10, as is shown in FIG. 5(c). The seal 45 makes contact not only with the upper surface of tray 10, but also with its lateral surface at indentations 14a through 14d. When the resin cools, shrinkage increases its bonding strength, thus avoiding the scenario common to prior art devices in which the bonded surfaces separated.

In this embodiment, a number of indentations are created in the periphery of tray 10. These may be used as injection gates, thus they can be covered by the sealant in a further injection. The sealant can alternatively be injected, not from above the data carrier, but through the side gates. The gate portions will not be conspicuous if this method is used, and there will be no gate residue on the surface of the data carrier.

Figure 6:
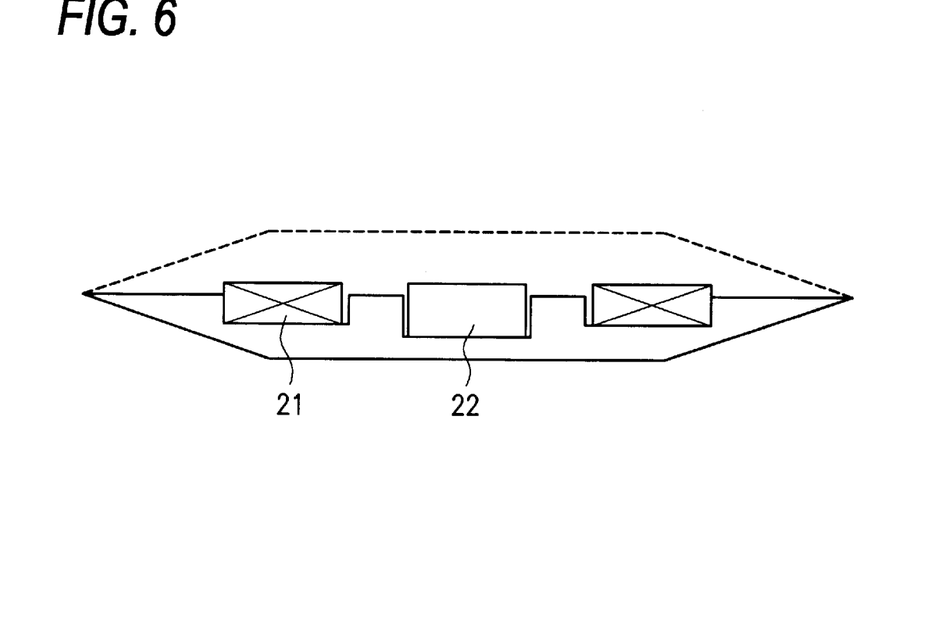
FIG. 6 is a cross section of another embodiment of the data carrier of this invention.

In this embodiment, the periphery of the tray is a wall which is perpendicular to the surface of the antenna coil. It is also possible for the periphery of the tray to have a flat circular surface, as shown in FIG. 6, instead of a perpendicular wall. Then if a thinner type of antenna coil is used, a thinner, flatter data carrier can be produced.

As we have explained in detail, according to the present invention, the antenna coil and the functional component are inserted into a molded tray which is then loaded into an injection mold to produce a data carrier. This allows a great number of data carriers to be mass-produced in a short time. As a result, the cost of the data carrier is substantially reduced. The use of injection molding does not limit the sealant material to a heat-resistant resin; rather, a variety of resin materials may be used.

According to the present invention, a cap is fixed to the cylindrical portion of the tray. This prevents the pressure from causing a direct impact on the functional component when the sealant is injected. The functional component cannot be damaged during injection molding. Therefore, the pace of production is increased, and the makers can choose whatever pressure they desire. Since the cap effectively locks the antenna coil and functional component in position, they cannot be dislodged during molding. They are sealed in their specified positions. This method also makes it easier to handle the partially finished work once the tray and the functional component have been assembled.

According to one aspect of the present invention, shallow indentations are cut out of the peripheral surface of the tray. When the spaces are filled with the resin which is to form the seal, this resin flows into these indentations. This creates a robust bonding between the seal and the tray. The seal cannot separate from the tray, and the water-resistant quality of the data carrier is improved.

According to another aspect of the present invention, the first depression in the cylindrical portion of the tray is the same shape as the functional component. This prevents any air from being trapped when the component is inserted into the first depression. There is no air in the tray during molding, and there is no possibility that the finished data carrier will expand.

According to another aspect of the present invention, the lead cable of the antenna coil is passed over the top of the main body of the coil and connected to the electronic circuit unit. Since the coil does experience pressure during injection molding, the lead cable will not rupture nor will its insulation be damaged. Therefore, the finished data carrier will be able to maintain its characteristics in a stable fashion.

Other embodiments of the invention will be apparent to those skilled in the art from a consideration of the specification and the practice of the invention disclosed herein. It is intended that the specification be considered exemplary only, with the true scope and spirit of the invention being indicated by the following claims.

What is claimed is:

1. A method of producing a data carrier, comprising the steps of:

connecting a functional component comprising an electronic circuit unit, to both ends of an antenna coil;

molding a tray provided with a cylindrical portion having a first depression in its surface which corresponds to a shape of said functional component, and with a second annular-shaped depression which surrounds said cylindrical portion;

inserting said functional component into said first depression and said antenna coil into said second annular-shaped depression of said tray;

installing a cap over said cylindrical portion to face toward an injection gate to protect said functional component from a high pressure of injection molding; and placing said tray in a lower mold and creating a seal by injection molding to seal said tray, wherein a lead cable of said antenna coil runs over said antenna coil.

2. A method of producing a data carrier, comprising the steps of:

connecting a functional component comprising an electronic circuit unit, to both ends of an antenna coil;

molding a tray provided with a cylindrical portion having a first depression in its surface and with a second annular-shaped depression which surrounds said cylindrical portion;

inserting said functional component into said first depression and said antenna coil into said second annular-shaped depression of said tray;

installing a cap over said cylindrical portion to face toward an injection gate to protect said functional component from a high pressure of injection molding; and creating a seal by injection molding to seal said tray and the upper portion of said cap.

3. A data carrier, comprising:

an antenna coil;

a functional component comprising an electronic circuit unit connected to both ends of said antenna coil;

a tray provided with a cylindrical portion having a first depression in its surface for supporting said functional component, and with a second annular-shaped depression which surrounds said cylindrical portion for supporting said antenna coil, and with a number of shallow indentations provided on a peripheral surface of said tray;

a cap installed over said cylindrical portion, said cap facing toward an injection gate so as to protect said functional component from a high pressure of injection molding; and a seal created by injection molding to seal said tray and said shallow indentations.

4. A method of producing a data carrier, comprising the steps of:

connecting a functional component comprising an electronic circuit unit, to both ends of an antenna coil;

molding a tray provided with a cylindrical portion having a first depression in its surface, with a second annular-shaped depression which surrounds said cylindrical portion, and with a number of shallow indentations provided on a peripheral surface of said tray;

inserting said functional component into said first depression and said antenna coil into said second annular-shaped depression of said tray;

installing a cap over said cylindrical portion to face toward an injection gate to protect said functional component from a high pressure of injection molding; and creating a seal by injection molding to seal said tray and said shallow indentations.

5. A data carrier, comprising:

an antenna coil;

a functional component comprising an electronic circuit unit, connected to both ends of said antenna coil;

a tray provided with a cylindrical portion having a first depression in its surface which corresponds to a shape of said functional component for supporting said functional component, and a second annular-shaped depression which surrounds said cylindrical portion for supporting said antenna coil;

a cap installed over said cylindrical portion, said cap facing toward an injection gate, so as to protect said functional component from a high pressure of injection molding; and a seal created by injection molding to seal said tray.

6. A method of producing a data carrier, comprising the steps of:

connecting a functional component comprising an electronic circuit unit, to both ends of an antenna coil;

molding a tray provided with a cylindrical portion having a first depression in its surface which corresponds to a shape of said functional component, and with a second annular-shaped depression which surrounds said cylindrical portion; and inserting said functional component into said first depression and said antenna coil into said second annular-shaped depression of said tray;

installing a cap over said cylindrical portion to face toward an injection gate to protect said functional component from a high pressure of injection molding; and placing said tray in a lower mold and creating a seal by injection molding to seal said tray.

7. A data carrier, comprising:

an antenna coil;

a functional component comprising an electronic circuit unit, connected to both ends of said antenna coil;

a tray provided with a cylindrical portion having a first depression in its surface for supporting said functional component, and a second annular-shaped depression which surrounds said cylindrical portion for supporting said antenna coil;

a cap installed over said cylindrical portion, said cap facing toward an injection gate so as to protect said functional component from a high pressure of injection molding; and a seal created by injection molding to hermetically seal the upper portion of said tray, wherein a lead cable of said antenna coil runs over said antenna coil.

8. A data carrier, comprising:

an antenna coil;

a functional component comprising an electronic circuit unit, connected to both ends of said antenna coil;

a tray provided with a cylindrical portion having a first depression in its surface for supporting said functional component, and with a second annular-shaped depression which surrounds said cylindrical portion for supporting said antenna coil;

a cap installed over said cylindrical portion, said cap facing toward an injection gate, so as to protect said functional component from a high pressure of injection molding; and a seal created by injection molding to seal said tray and the upper portion of said cap.

9. A data carrier according to claim 8, wherein said seal has virtually the same external shape as said tray.

* * * * *

UNITED STATES PATENT AND TRADEMARK OFFICE
CERTIFICATE OF CORRECTION

PATENT NO.   : 6,299,070 B1
DATED        : October 9, 2001
INVENTOR(S)  : Kunitoshi Furukawa

It is certified that error appears in the above-identified patent and that said Letters Patent is hereby corrected as shown below:

<u>Title page,</u>
-- Item [30], Foreign Application Priority Data
March 31, 1998 (JP)........................10-085498 --.

Signed and Sealed this

Second Day of July, 2002

Attest:

Attesting Officer

JAMES E. ROGAN
Director of the United States Patent and Trademark Office